United States Patent
Kubo et al.

(10) Patent No.: US 7,218,941 B1
(45) Date of Patent: May 15, 2007

(54) SYSTEM FOR CONNECTING USERS WITH LOCATION SPECIFIC INFORMATION FROM OFFICIAL AND UNOFFICIAL SOURCES

(75) Inventors: Kiyokaz J. Kubo, Portland, OR (US); Nicholas L. Farina, Portland, OR (US)

(73) Assignee: Spotlight Mobile, Inc., Portland, OR (US)

( * ) Notice: Subject to any disclaimer, the term of this patent is extended or adjusted under 35 U.S.C. 154(b) by 186 days.

(21) Appl. No.: 10/801,522

(22) Filed: Mar. 12, 2004

Related U.S. Application Data (60) Provisional application No. 60/454,402, filed on Mar. 12, 2003.

(51) Int. Cl.
*H04Q 7/20* (2006.01)
(52) U.S. Cl. .............................. 455/456.6; 455/456.1; 455/456.5
(58) Field of Classification Search .. 455/456.1–456.6, 455/9, 13.2; 342/357.07, 458
See application file for complete search history.

(56) References Cited

U.S. PATENT DOCUMENTS

| | | | |
|---|---|---|---|
| 6,686,881 B1* | 2/2004 | Lu et al. ..................... | 342/458 |
| 6,907,238 B2* | 6/2005 | Leung ...................... | 455/404.1 |
| 2004/0012519 A1* | 1/2004 | Durst et al. ............ | 342/357.07 |
| 2005/0277426 A1* | 12/2005 | Evans et al. ............. | 455/456.1 |

OTHER PUBLICATIONS

Burrell, Jenna et al., E-graffiti: evaluating real-world use of a context-aware system; Cornell University, *Interacting with Computers*, vol. 14, No. 4, 2002, pp. 301-312, no month listed.
Burrell, Jenna et al., "Collectively Defining Context in a Mobile, Networked Computing Environment," *Conference on Human Factors in Computing Systems, CHI 2001 Extended Abstracts*, 2000, 2 pgs, no month listed.
Burrell, Jenna et al., "Designing for Context: Usability in a Ubiquitous Environment," *ACM Conference on Universal Usability, Proceedings on the 2000 Conference on Universal Usability*, 2000, pp. 80-84, no month listed.

* cited by examiner

*Primary Examiner*—CongVan Tran
(74) *Attorney, Agent, or Firm*—Marger, Johnson & McCollom, P.C.

(57) ABSTRACT

A system for providing users with location specific information about where they are, social information about what other users are thinking, and navigational information about where they would like to go and how to get there is proposed. The system is comprised of a mobile device, a content server, a communications link between the device and the servers, and a way to determine a current location. The system is then housed in a travel sized briefcase/box.

23 Claims, 4 Drawing Sheets

Figure 3: Exhibit Design and Usage

FIGURE 4: 2 Hotspot Threshold Boundaries

FIGURE 5: Placement of Points

SYSTEM FOR CONNECTING USERS WITH LOCATION SPECIFIC INFORMATION FROM OFFICIAL AND UNOFFICIAL SOURCES

RELATED APPLICATION DATA

This application claims priority from U.S. Provisional Application No. 60/454,402, filed Mar. 12, 2003, which is hereby incorporated by reference.

BACKGROUND

Navigation of any unfamiliar space can be overwhelming and difficult. Even finding all the items on a trip to a grocery store can be difficult, however, imagine your grocery store is 1.3 million square feet, and this is your first visit. In addition, 80,000 customers wander around you, you have 1,600 potential products you may want to purchase, and you must select all your items by the end of the day. The task seems daunting at best, but is one that every visitor to a large tradeshow encounters upon arrival at the convention center. Currently the system of navigation at tradeshows means looking up each potential exhibit in a 5 lb guide, locating them on a map, and drawing out the best way to plan your visit. Providing a better way to manage this task could be invaluable. Now imagine you are at this show as a 10-person group from your company. Communication is of the essence; however, contemporary cellular phones are rendered useless in most convention halls. A way to see what your coworkers are finding useful, and creating a way to communicate effectively with all your coworkers could prove critical.

At trade shows, the overwhelming amount of undirected information sent at you may be the main concern, but what about a museum environment? Here, many feel, too little is said about the works. How are the exhibits relevant to one another, and to me, as a visitor? A need exists for a device that will allow users to learn more about the pieces of art they are viewing, while not directing attention away from the art itself. In addition, as social beings, people have expressed a need to share their experiences in the museum. Users would like a way to "talk back" about paintings, and how they make them feel, or even share works they liked so others can see what is most interesting at the museum.

Finally, imaging being able to encapsulate all this functionality into a portable kit; effectively solving these problems with a simple travel sized kit.

SUMMARY OF THE INVENTION

A system comprising of mobile devices for user interaction, Ir Beacons, to determine position, a wireless network to send information to the mobile devices based upon the Ir beacon position determination, a server to hold message boards with user feedback and the content about each exhibit, and a server to hold content about each exhibit; almost entirely contained within a travel sized briefcase. Other location finding mechanism, such as RF, GPS, or transmitter triangulation can be used in place of the Ir beacons (See LOCATION IDENTIFICATION PLATFORM)

In another embodiment, the position could be determined by mechanisms such as RF beacons. In this case the system would function in the same way, but instead of pointing the mobile device at an Ir beacon, users would simply need to be in the area covered by an RF beacon, and the device would know the location of the user. See LOCATION IDENTIFICATION PLATFORM for more information.

Still another location finding system might be GPS or Wireless triangulation. In this embodiment, a piece of hardware would be included to sense GPS signals and determine location through triangulation. Or, the wireless mobile device used for communication could also be used to test signal strength and quality amongst one or several access points to determine location. See LOCATION IDENTIFICATION PLATFORM for more information. A person skilled in the art will recognize that other location finding technologies can be used, even ones that are not wireless. For example, each piece could be tagged with a number, and that number keyed into the device to identify where the user is.

Finally, general information can also be provided. This general information is not necessarily location specific, and does not require any location sensing technology, but rather, can be obtained by interacting with the mobile device, pulling information from a directory or index.

Figure 2:
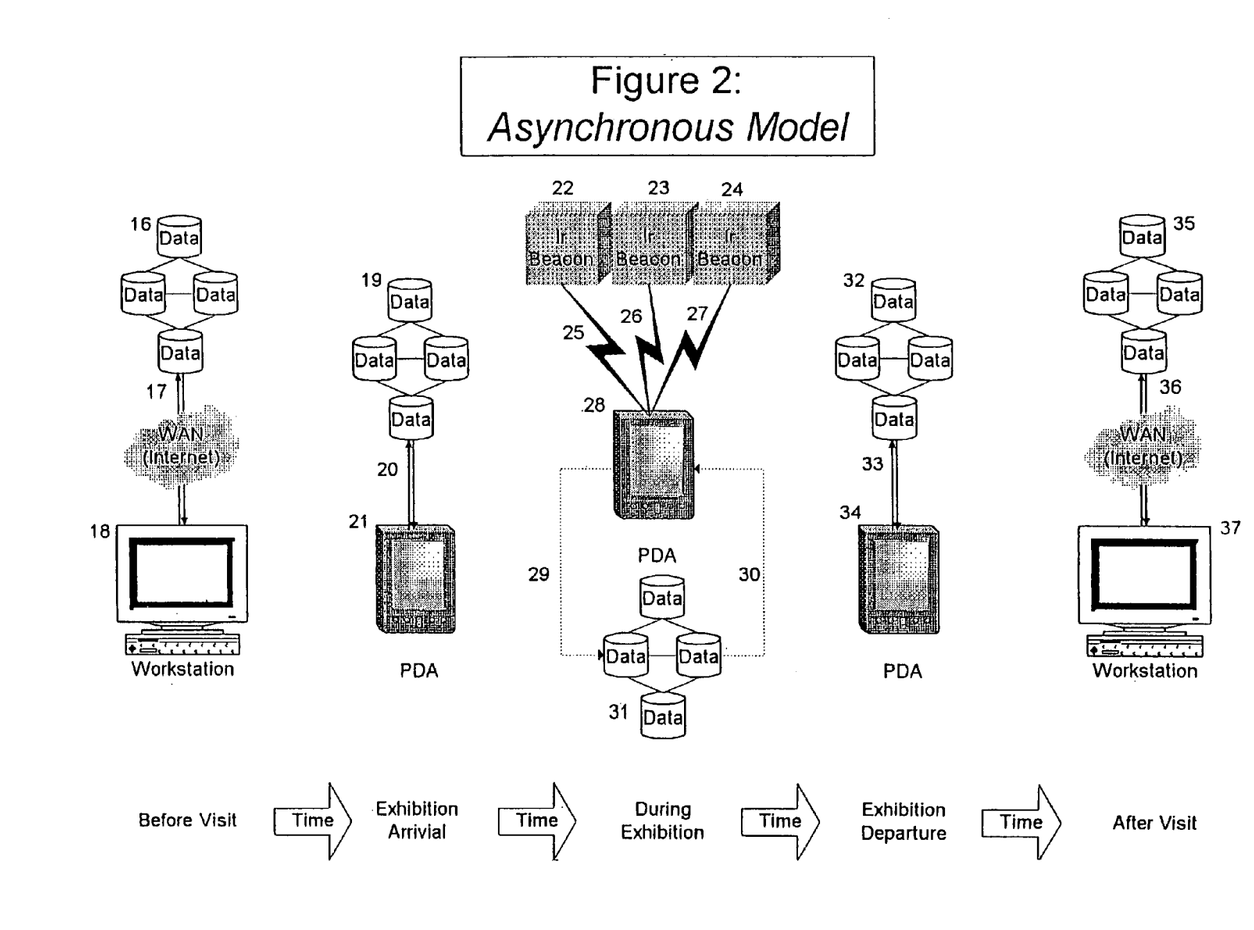
FIG. 2: Asynchronous System Model. This is to be read from the left to the right in time. The asynchronous model would be necessary in the case that network communication is not possible.

In the preferred embodiment, the mobile device contains full multimedia capabilities. This means that, in addition to an Ir port, network port, and local storage, the device can have a full color display and sound and video capabilities. (Ir port is used for determining location. If a different system is used, such as GPS, RF, or network triangulation, the Ir port would not be a requirement and a port with GPS or RF interface would be required instead.) If such a device is not available, a paired down version of the software would be available to make use of the more limited capabilities of the device. Even the requirement of a network interface can be relaxed as seen in FIG. 2 and explained below. Presentation of the multimedia and user interface is handled through the presentation software. (SEE PRESENTATION SOFTWARE)

If locations do not have access to wireless network capabilities, such as cell phone, 802.11x or otherwise, the system would store all the information on the mobile device itself. In this embodiment (pictured in FIG. 2, and explained in SYNC SYSTEM), location would be determined in one of the forms as described above, and then the correct data corresponding to this location would be displayed to the user without use of any network communication. Users could thus use the device the same as if there were network communication, however certain functions would be inoperable, such as real time messaging of other users. All systems would be restored and the system would synchronize any new information when network coverage was resumed. Notes posted by the user would appear for other users to view as soon as network coverage was resumed. This embodiment becomes necessary in areas that cannot tolerate electromagnetic interference (EMI), or produce too much EMI for wireless network communication to be feasible. Examples include hospitals and certain tradeshows with many machines operating. (See SYNC SYSTEM).

As the mobile devices are used, they log the actions of the user, and the information presented to the user. In this way, the system is able to create maps and analysis of what information is being accessed, for how long, and in what order. Where the users go and what they look at is all tracked for use by the venue or the user.

While the software will be able to feed "official" information about exhibits, the software also includes an easy to use interface that allows for user feedback. When a user feels inclined to leave a comment about an object, he or she can simply do so on the device. The physical space will then be annotated, and future users that enter that space will be able to view what past users said. At a trade show these comments might be directed only at coworkers, or even only at oneself in the case of a reminder; while in a museum or campus setting, these comments could be directed at the general public, meant to spark discussion or share personal experiences.

A certain level of personalization will also be encouraged. Through this users will be able to get specific recommendations about what to see, and filter non-relevant information. (See PERSONALIZATION).

Beyond the appliance, a web interface is also available for the user to interact with the database before and after the exhibit. This interface will allow for preplanning and post exhibit evaluation with features for note posting, navigation, and system personalization.

The bulk of the system is then contained in a travel sized box. This box can be imagined as a briefcase, or travel case. Built directly into the box are compartments for all of the mobile devices, the server (if applicable), and device cradles or some other network interface such as WIFI. Some cases do not have servers, but are simply device boxes, containing only devices. These boxes can be connected via USB or Wireless to a server box. A few ports which would include at least, a network interface, USB connection, and power can also be exposed. The box can be closed, locked, and carried away. It is very sturdy and robust, and could be thrown in an overhead bin on an airplane, or even checked as luggage. When the destination is reached, simply plug in the box to power and network (if needed), open, and start handing out devices.

Invention Usage Scenario

Users of this system will benefit from improved information and increased awareness of their location. Using the embodiment described first as an example, consumers of this technology will use it as follows.

While at home or their workplace, users would browse to a website where they could plan out their visit, and make lists and notes about what they need to cover. They could also post comments to user forms and ask questions before leaving their desk.

Upon arriving at a venue, users will receive a mobile device from the exhibit moderators. If this is a trade show, they might receive the mobile device from an automatic vending machine or information booth personnel. If it were a museum environment, they might receive the device from the ticket counter, or the information booth.

Users would then log onto the device providing their user name and password they picked out when they logged on from home or work. This could be an identification card if the user is at a trade show, or simply a stylus input if at a less formal venue. The device would take this identification and bring up the lists and preparation the user created while away from the venue. If the user has never logged on to the system before, a short form would be filled out to populate the device with user preferences. These could also be taken from the identification card if applicable. This identification could help shape the suggestions the user receives. Finally, users could also choose to not enter a user name and password, and wander about the exhibit, not utilizing the pre and post planning features, but still benefiting from other users' comments, maps, and the wealth of information provided by the exhibit.

The user would then scan any exhibit, and the device would show the user where they are and how to get to where they want to go. It would also show all the information about what they scanned, and any message boards associated with the item. The user could also search the directory via the mobile device and create a list of places to go at this point. The listing would even show what people are most interested in at the venue, and users would benefit from these social recommendations.

As the user interacts with the mobile device, it is logging their movements and interactions. In this way, it is able to paint a picture for the user showing what they did, and for the venue to track what information relevance, where people are going and what they are doing.

After a full day of gaining information, playing games, and navigating the venue, users would return the devices to the locations from which they received them, and return to their homes or offices. At this point they would be able see what they did at the event via their web browsers. For instance, if they visited a trade show they could list all the contacts they made, and all the places they visited. Or, if they visited a museum, the list of exhibits they visited with links to more information available throughout the Internet allows them to extend their visit far beyond the museum walls. In addition, they now have the opportunity to plan their next visit.

This technology will, for the first time, enable users to look beyond what is in the physical space surrounding them and help direct them more efficiently.

On the back end, the venue is prepared by setting up a kit at the venue. A kit is shipped or carried to a venue, and plugged into power and Ethernet. It is opened, and all devices are ready to be handed out. If there is network coverage in the venue, the devices will connect to the server in the kit for data. This is accomplished by connecting the Ethernet jack on the kit to the existing network, and existing access points route data to and from the kit server. If, however, there is no network coverage, all devices will sync up while in the kit, and be prepared to hand out after synchronization. The kit is entirely self contained, and requires no further setup. (SEE KIT)

If new information is available, updates are made to the content or the touring software itself, the kit will connect via its network interface to a central server and download the updates to its local storage; distributing the new content to the information devices as they are available.

DESCRIPTION OF DRAWINGS

Figure 1:
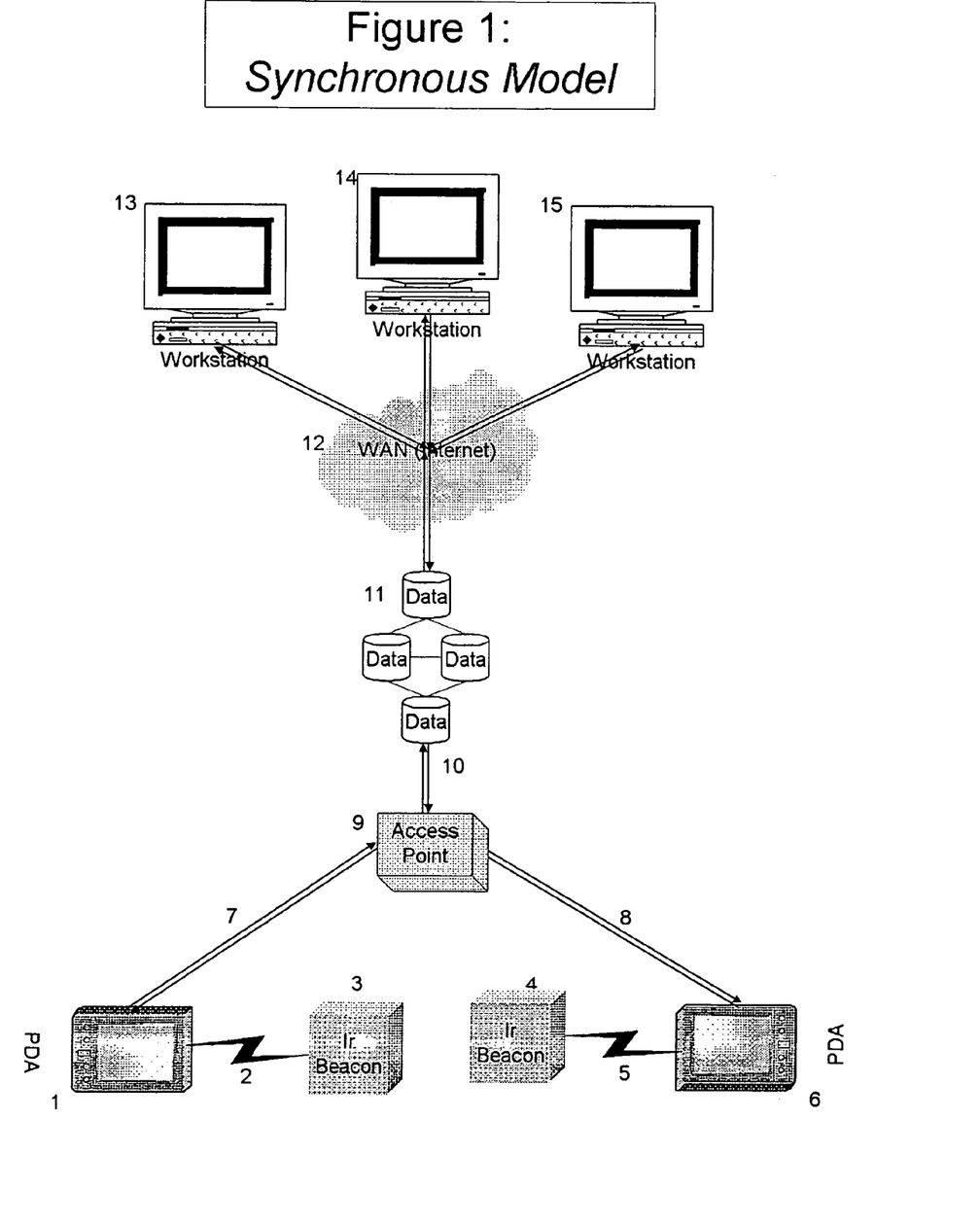
FIG. 1: Synchronous System Model. This is the preferred embodiment of the invention, with the option of replacing Ir Beacons with other location sensing technologies.

FIG. 1 shows the preferred embodiment of the system architecture where Ir is used for location finding and the information is transferred in real time to servers 11. PDA's 1 and 6 represent any random user of the system. Links 2 and 5 then represent the connection to the device that determines the location of the user. Beacons 3 and 4 represent, in this example, Ir beacons. These can be replaced with satellites, and links 2 and 5 would then represent the connection to the satellite. If 3 and 4 are replaced with RF beacons, 2 and 5 would, thus, be the connection to the RF identifier. Finally, if a network access point triangulation method is used, 3 and 4 would represent the logic that determines the location from these access points (9), and not physical devices.

Links 7 and 8 represent the data transmission to and from the access point, 9, which is, in turn, connected to the database, 11, via a wired backbone, 10. Using PDA 1 as an example, (where PDA 6 is identical) when the PDA receives the location information from 3 via 2, PDA 1 checks its local drive to check for a cached version of the information required. If it is not found, or is found to be outdated, PDA 1 uses its link 7 to access point 9 to reach the database 11. The data is then returned back via the access point 9 and data link 7.

It is, of course, possible to access the database by not physically checking in with 3. The user can browse to exhibits and information dynamically, wherever they are via their connection to the database. They can then post notes to any exhibit stored in 11. If the system relies on GPS for location then whatever point they want to annotate can be marked, whether it has been designated as a exhibit or not. Anywhere the user goes, he/she can post notes, and all in real time. Answer to posts can then be viewed as they are posted. Still, even where 7 is not available, the user may still post notes, with these being synchronized when coverage resumes (see FIG. 2, *Asynch. Commun.*).

Items 13, 14, and 15 represent terminals where users can access the data stored in 11 via the Internet, 12. This allows for pre visit planning, and post visit reflections. Lists of contacts made, and exhibits visited can be viewed from any Internet connected terminal. Or, before a visit, a plan of action can be created, and questions and reminders can be noted which you hope to get answered at the show.

Users who never even visit the areas can help contribute too if they like. For instance, in an art museum, if a patron posts a question that no one at the museum can answer, users anywhere in the world could answer the question instead.

FIG. 2 represents the asynchronous model of the same system. This method would be necessary in the case that network coverage is intermittent, or unavailable. In this diagram 16, 19, 31, 32, and 35 all represent the same database, or synchronized databases. PDA's 21, 28, and 34 all represent a single user.

As in FIG. 1, users can, again, plan out their visit before hand using terminal 18 and its connection to our database 16 via the Internet 17. Users can organize their route, ask questions, make notes and reminders, or enter preferences here.

Moving along in time, when the user arrives at the exhibition, they receive a PDA, 21, which is synchronized up to the same database 19 they accessed before (16). Link 20 represents either a wired connection that is used at the beginning of the exhibition, such as a hotsync cradle, or a wireless connection that may not be available later on in the exhibit. All data is preloaded on the device, besides the most recent data, which is updated at this time.

While browsing the exhibit, the user 28 scans exhibits, 22, 23, and 24 via the links 25, 26, and 27 respectively. As in FIG. 1, this model shows these as Ir beacons. They could very well be other methods like RF, GPS, or access point triangulation as described above. Notes can still be posted by the user, but the notes will not be available to other users until the next time the user synchronizes their device. This could be when coverage resumes, or when they return the device at the end of the exhibition.

Dotted Links 29 and 30 represent intermittent coverage. Should coverage be resumed from time to time, the mobile device will automatically synchronize its internal database with that of the server 31. Any new notes posted by the user will be added to the database, and any new items in the database will be available to the user.

Still, this link is not required as any new information will also be synchronized upon departure. Link 33 between PDA 34 and database 32 illustrates this phase. Now, when the user is back at their home or office (or any computer 37 connected to the internet), they will be able to see what transpired at the exhibition. For a trade show, this might include contacts they made, any notes they might have left themselves for each booth and the show in general, and booths they visited. They could also add new comments and answer questions left by other users.

The most important concept to note about FIG. 2 is that network coverage is not required for the entire exhibition. While network coverage would be preferred, the device has the logic to understand when it is connected and when it is not connected, thus enabling it to cache information to its local memory when coverage is not available.

Figure 3:
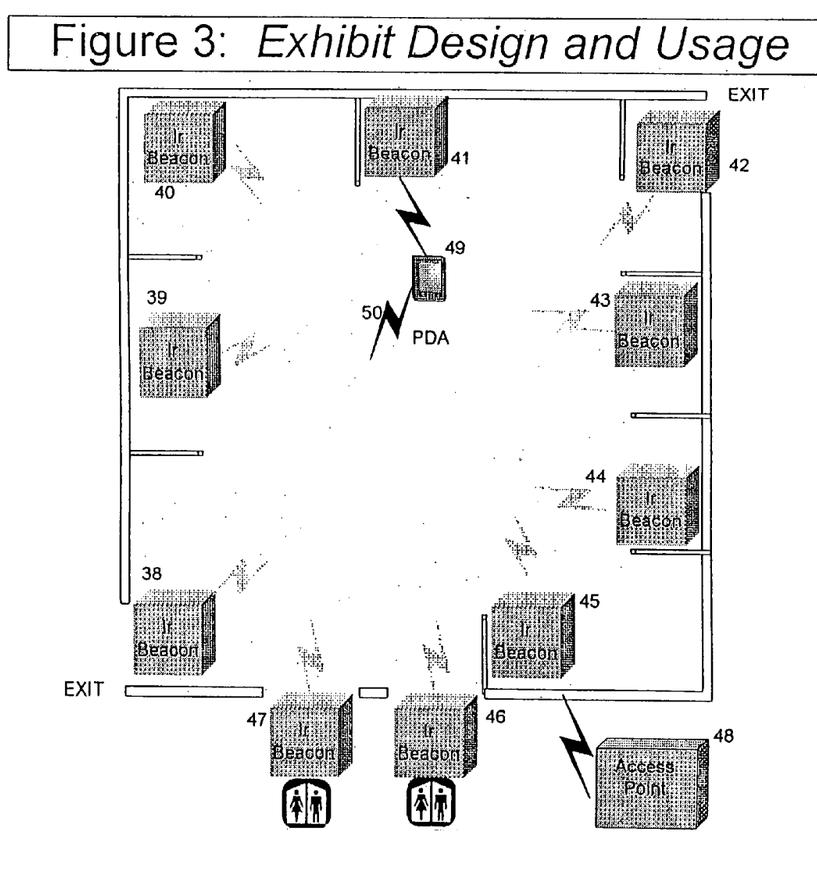
FIG. 3: Exhibit Design and Usage. This shows usage of the system in an indoor exhibit hall.

FIG. 3 represents a typical usage of the system. The user and his/her PDA 49, move about the exhibit space scanning the exhibits 39, 40, 41, 43, 44, and 45. In addition, special locations like the exits 38 and 42, and the restrooms 46 and 47 are marked so that users can get their location wherever they might be, and find directions to wherever they might want to go. In this example, the user has scanned exhibit 41. Wireless link 50 sends this information to access point 48, which in turn updates the database of the user's location. The system then sends the user the appropriate information for their location. In addition, since the system now knows where the user has been it can present reports to the exhibit organizers about aggregate traffic, etc.

Figure 4:
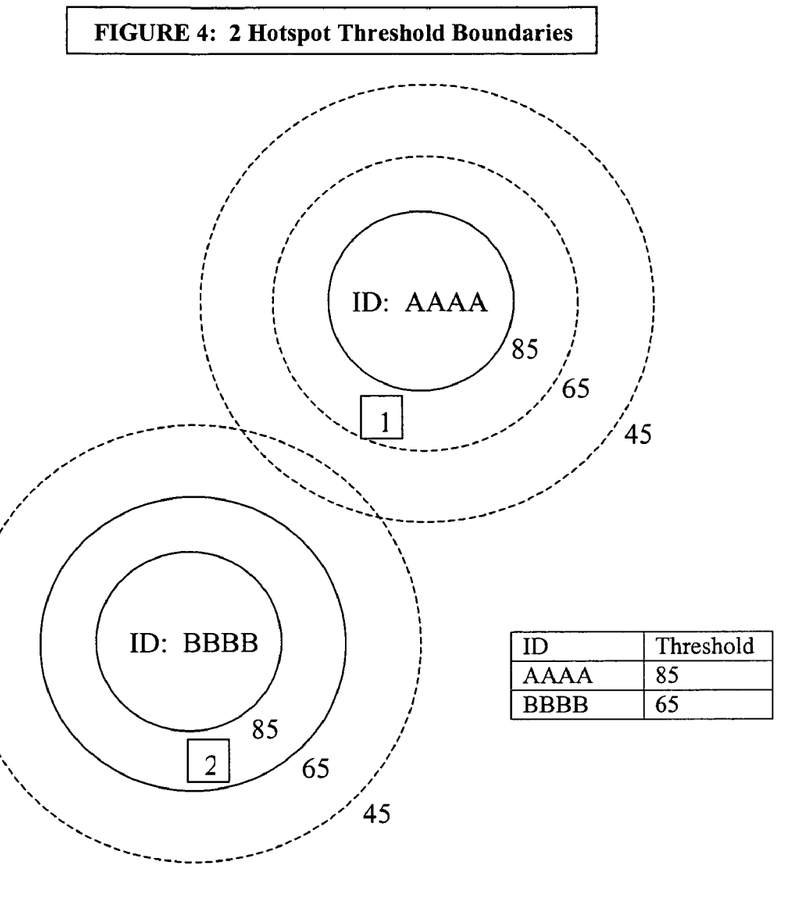
FIG. 4: WIFI Location Awareness. This drawing shows how single access point location awareness works.

FIG. 4 shows two access points and their associated signal strength boundaries. There are two access points in this drawing: AAAA, and BBBB. The access points are at the centers of these circles where ID: xxxx is written. As the mobile device travels further from the Access Point, the signal strength decreases. The outer most circle in this figure has a signal strength of 45, while the inner most has a signal strength of 85. Units 1 and 2 each contain the table listed to the right in their local memory. This table contains the threshold values. When a device crosses one of these thresholds for its listed access point, it knows it is close enough to that access point.

In the figure, device 1 has crossed over 65 signal strength on access point AAAA, but when it checks its threshold table stored locally, it finds that the signal strength must be 85 to be considered close to AAAA, and it thus does nothing. Device 2, however, has crossed over the 65 signal strength threshold on access point BBBB. Checking the same table stored locally on device 2, it sees that 65 is considered close enough to BBBB, and it triggers whatever content is associated with BBBB.

Figure 5:
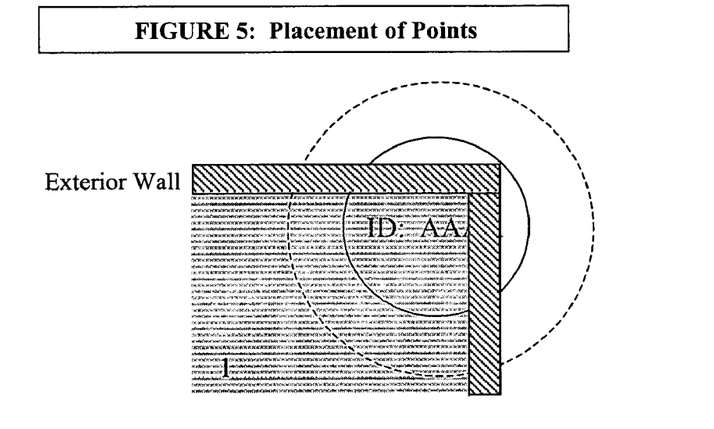
FIG. 5: WIFI Location Awareness. This drawing shows how location can be better guessed by intelligently placing access points.

The figure shows that, typically, access point signal strengths are about the same in all directions around each point, forming circles. Because of this, it can be important to place the points intelligently around the space. For example, FIG. 5 shows that if points are placed on exterior walls, it greatly reduces the possible location of the user to just area 1.

Organizer Benefits

Exhibition organizers receive a wealth of benefits from usage of this system. With the ability to track users' aggregate movements and log their every interaction with the device and location, it is possible to better lay out a venue. If the exhibition is a trade show, it is possible to better price booths, and share traffic information with vendors at the trade show. Content can be easily added to the system and every user could feasibly be notified of events or emergencies at any time.

Location Identification Platform

Indoors, where location specification must be granular, the use of Ir beacons is the first choice for location finding. However, in larger outdoor areas, or where exact location and direction are not as important, other methods of determining location become more viable.

Meanwhile, Radio Frequency identification using RF standards like Bluetooth, and 802.11 is a second option for determining location both indoors and outdoors to specific objects. In certain situations, use of a technology like RF is ideal because it would require minimal interaction by a user. Imagine small spherical information spaces through which users can pass. Upon entering one of these small spaces, the device knows which RF tag it is associated with, and can notify the database where the user is currently standing. The user can then pass out of the space, and the device will again know that the same information may no longer be relevant. Users are not forced to aim their device at an object, and the device always knows where the user is.

In yet another embodiment of the system, location could be determined by GPS. This is typically only feasible outdoors. Still, using GPS for location is effective to within 3 meters, and is easily implemented using existing technologies. In addition, it is possible for users to decide which spaces are relevant. Objects do not have to be "tagged" with an RF or Ir beacon. Instead, any location on earth can be deemed relevant by a user, and then future users can benefit from the eyes of all users that came before.

Using network access point triangulation can be useful where all other systems may be unnecessary or impractical. A certain level of granularity can be achieved by measuring the signal strength of access points surrounding the appliance. And by taking these values, it is possible to determine where a user is to a fairly precise degree. The drawbacks of a system of this nature is that it is not possible to determine the direction the user is facing, and network coverage must overlap substantially. Therefore the cost of this kind of system may be limiting. Instead, however, using the single access point that a user is nearest to gives a general idea of where the user is located, and this is, in many situations, enough detail to be able to present relevant information. In addition, where 802.11x is used for the data transmission, this system does not require any additional hardware. This type of system also works both indoors and outdoors.

It is also possible to determine, to perhaps a lesser degree but also by 802.11x, location using a single access point. In such an embodiment, a single access point (any standard off the shelf access point will do) is connected to power. The access point is NOT connected to data. This novel idea makes it possible to place access points all through out a space with little infrastructure improvements. Access points can even be installed in existing track lighting! Other existing networks can be used for data or, using the sync system, no data network need exist.

Then, as with standard triangulation techniques, signal strength from the access point is measured, and if a mobile device's signal strength to an access point increases above a predefined threshold stored locally on the device, the device is determined to be within the space. (SEE FIG. 4).

In practice, signal strength is checked from all surrounding access points 3 times every 3 seconds, taking the average of the 3 readings from each point. By taking the reading every 3 seconds saves considerable battery power, while still being responsive enough to be useful. Taking the average of 3 readings reduces the likelihood of a false positive.

Readings are provided through software interfacing with the wireless card on the device. All threshold tables are stored locally because the access points are not necessarily wired and thus act simply as dumb beacons providing no data.

If more then one access point is found to have a signal strength above their respective threshold values, it is possible that general information about the space could be given. If a single choice must be made, the access point with the higher value relative to its threshold will be chosen. So, if there are 2 access points, A and B, and A has a threshold of 60, and B has a threshold of 80, and the readings are 68 on A, and 81 on B, A will be chosen due to its higher value relative to its threshold (8>1).

Finally, as the least technological and most straightforward method of determining position, the touch screen can be used as a simple numeric display. Users can then simply dial in the ID of the exhibit much like they would on a telephone. The screen still provides all the video, etc, but also fills this function in this embodiment. This is the method used currently by museums employing audio-only tours. While this may take a bit longer then automatic techniques, this method is understood universally, costs nothing, and provides complete control to the user. This system will also work indoors and outdoors.

These location finding mechanisms may be used separately, or together. For instance, when a user enters a large area with specific information, simply supplying information based upon what access point the user is connected to would be specific enough. However, within that space, the user may approach a particular object of interest, and then location could be sent via a system like Ir, thus giving the more specific location information necessary.

And of course, it is also possible to get information about objects by selecting them through the interface. For example, an index could list all objects, from which an object could be selected

Personalization

This invention also allows for personalization of the system. A short questionnaire allows users to enter preferences, such as language or interests. This can be done on the device when first received, or on an Internet connected terminal before arriving at the venue. Then, information can be filtered out to allow only comments or recommendations that have, in the past, been interesting to users with similar preferences.

As an example, consider a visitor to a college campus. A prospective student interested in the Arts and Sciences school and athletics simply enters in their preferences. Then, comments and information of interest to Engineers, but not to Arts and Science students, might be filtered out. In addition, it would be possible to recommend tours to the prospective student based upon what other Arts and Science students liked.

Kit

All of the hardware that enables the functionality described herein is contained in a simple travel kit. The server, mobile devices, and network interfaces are all housed in a carry on size briefcase or travel case. Such a kit makes install simple, and allows the system to be carried to and deployed at just about any location.

When opened, the kit reveals the mobile devices, and a display. Human interface devices are also available within the kit. Power is supplied the kit to charge the devices, and power the server. In addition, an Ethernet port can be plugged into an onsite LAN to get updates from a central server, or distribute live content to mobile devices.

Some kits do not include a server. If this kind of "slave" kit is used, it can be daisy chained to the "master" kit (which contains a server) and communicates with the "master" kit's server through USB or WIFI. If using USB, then the two kits are physically chained together with a USB cable. If the interface is Wireless, the "slave" kit need only be placed near the "master" kit, and configured to the correct network name. In either scenario, the "slave" kit is also plugged into power.

Sync System

As described above, it is not necessary in the system to have a live connected data network at all times. The benefits of such a network are clear. For example, if a user is looking for a web page, like Google, the user is directed to a web server which provides Google to the user. If another user is also looking for Google, they too get directed to the same web server to retrieve it. If Google wants to change its content, it must only change the content on the server, then, when the users connect again, they will automatically get the most recent data. However, it is not always possible, nor feasible to provide such a live connected network. In these cases the sync system provides the same benefits without all the cost and hassle of installation of such a network.

In the system, the mobile devices periodically come in contact with a live network. A server node resides on the network at all times. This server maintains the most up to date information. If a piece of content needs to be changed, it is here that the update is made.

When each roaming node first comes in contact with the server, it is registered with it. The server then sends out the most up to date information to the node to be cached on the roaming node. If the node leaves the network, the server makes a note of what information the node has received so far, and then waits for another node connection.

When another roaming node comes on the network, it checks in with the server, and the two begin communication. If there is information on the roaming node, it shares it with the server and then checks the server for new or changed information. If new information exists, it begins downloading it.

All the while, the server keeps track of all the nodes in its unconnected network, which nodes are currently connected, and all the data on each node. If new information is added to the server while nodes are connected, the server can force an update to all connected nodes.

In this way, we can maintain a synchronized network of devices without the need of an extensive network. Because of the automatic connection and content scanning, it is as if we have a live network. In addition, the single data repository makes updates easy. If there are connected and unconnected areas throughout a space, devices can check in every time they come in contact with a network, even if only for a brief period. Even the mechanism for synchronizing can be updated by the system.

In practice this is accomplished by having each roaming node be both a server and client. Synchronization software is set to run all the time on each node. When this sync software starts up, it starts a server thread which begins listening for client connections all the time. In the mean time, it also starts up its own client which it can use to send an update to the server whenever it needs to. The actual communication is accomplished using standard TCP and UDP protocols.

If the server needs to send info to the node, it can connect to the node's server on a predetermined port. It can then begin sending the device updates, content, or any other data it has, including an update to the synchronization program itself. The same is true for the mobile device. If it needs to contact the server, to check in, check out, or simply report its current battery life, it can connect to the server on a predetermined port, and report its status, uploading any data it may have as well.

Presentation Software

Information is presented to the user through a presentation software layer. This software runs on top of the synchronization software. It can be thought of as a container. Interfaces, which are designed in HTML, Flash, MP4, and custom components, can be displayed in the container, and changes to these interfaces made with out a change to the underlying container software. The presentation software also handles complex multimedia playback like video and audio.

To build an interface, the container software reads an XML file which defines how the container will function. This includes defining how hardware buttons will react to presses, and how the interface is laid out on the screen. The following example XML interface file creates 2 windows on the screen. The top window is given a size, and contains a flash file. The bottom window is also given a size and an HTML file to display.

```
<Tour>
    <Interface>
        <Window name=topwindow x=0 y=0 width=240 height=200>
            <Flash>
                <Link>flash.swf</Link>
            </Flash>
        </Window>
        <Window name=bottomWindow x=0 y=200 width=240 height=120>
            <HTML>
                <Link>BottomPanel.html</Link>
            </HTML>
        </Window>
    </Interface>
</Tour>
```

Commands are passed to the container application to handle complex functions. For example, the #playAudio command passes a file to play from the HTML or Flash file to the container, and the container plays back the audio. Writing a database is also handled in the same way. For example, to log what a users clicks on, the interface can pass a #log command with parameters describing the action the user has executed. The parameters are then written to storage by the container application.

An Example Installation

Consider the following example of an installation. The installation uses mobile devices. For location awareness, the screen doubles as a numeric keypad. The user simply enters the ID of the exhibit, such as 128, and the device pulls the audio and text for the exhibit automatically.

If there is no wireless network coverage throughout the installation, devices are synchronized upon return to the rental station. In order to fit all the content on the devices, a very low bit rate, high compression algorithm (such as Ogg Vorbis) is used. It is also possible to use, for example, the MP3 algorithm. In addition, the devices are outfitted with additional memory cards.

There are two methods of synchronization. The first method uses daisy chained USB ports. All devices are plugged into USB ports on a large stack of hubs, and communicate with the server via USB. The second method is via wireless network. In this embodiment, the mobile device communicates with the server via a wireless link (See Synchronization of Devices).

The main purpose of the server is to enable the system administrator to easily add new content to the system, synchronize the devices, check the status of all the mobile devices, and collect usage statistics. Each of these systems, however, is complex, and includes many features.

Adding Content

To add content, an administrator inserts a content source (i.e. CD, Zip Disk, etc.) into the server. The software then extracts all the audio data and encodes it into our high compression format. The accompanying text of the speech is then copied into the system. An algorithm is then run over the text and speech, matching the two up in time. With this data, the user can skim the text and begin playback at any point within the text. Text can also be highlighted as it is read, etc. (See Playback Location for more information on this technique).

Video, images, and other sources can also be added via this same method. The exhibit ID is associated with the image, video, etc. and then synchronized with the mobile devices when they dock. Finally, news, updates, and time sensitive content can be added via a special interface that allows for content like "Today's Events" or a reminder that pops up if the location is about to close. All the administrator of the system has to do is enter the data above, and the device synchronization occurs. The information will just automatically be synchronized without manually intervention.

Playback Location

One innovative feature in particular is the ability to easily control playback location by clicking on the section of the text sought to be heard. When a visitor accesses some audio narration content (such as the kind of content currently found in museums with audio-only tours), the corresponding transcript of that audio will appear on the mobile device's screen. The visitor can scroll through it, and click at any point in the text. This triggers the device to begin playback of the audio stream at that position. The visitor may skim through and listen to only the parts of the narration that seem most interesting to him.

Allowing the visitor to listen to only the parts of the narration of interest is enabled using an automatic speech timing algorithm that is run on the server when new content is added. Given only the spoken narration, and its corresponding transcript (that the installation already has in computerized format) the server performs the following steps:

1) It runs the audio through a specially configured speech recognition engine to identify as many words in the text (and the location of those words in the audio stream) as possible.
2) This identified text is matched up with the original transcript using a sequence-matching algorithm.
3) The subsequent words in the transcript that we did not locate are run through a series of logic analysis steps to approximate their location.
4) The server presents the result to the administrator, and the administrator can test it and make some final adjustments before it is sent to the mobile devices.
5) Now the visitors may click at any point in the text and begin playback there.

Synchronization of Devices

If there is no wireless network, it becomes necessary to synchronize each device after use. All operations with the server are able to occur as a result of synchronizing. There are two opportunities where a mobile device will try to talk to the server:

1) When a visitor is finished using a mobile device, the device is placed in the docking station and it synchronizes once with the server, to tell the server its vitals (battery status, software version, etc) and to exchange notes (get the latest discussion group comments, and upload new comments made by visitors on that device).
2) Overnight, all mobile devices take turns connecting to the system and doing major updates, like getting new audio/video content, and any amount of synchronizing that involves a lot of data. This happens overnight to prevent interference with the normal flow of handing out devices during the day.

In both the wireless and USB methods all devices are connected to the server at, basically, the same time and receive the updates simultaneously. Depending on the number of devices, several wireless channels may be used. All the devices can be monitored in real time, and all their vital stats (charge, software level, synchronization level, etc.) obtained via the server.

In some instances, it is necessary to cycle through connections. For example, because only a few devices can connect on a single wireless channel at a time, it is necessary to synch devices in groups of 3 (for example). The server syncs devices 3 at a time until they are all synched.

Each mobile device is has a unique IP address which is used to communicate with it. The last octet of this number can be the same as the device ID that the system keeps track of for logging and synchronization, but it is not necessary.

The location where the mobile devices are passed out to visitors will have one or more wireless access points to communicate with the mobile devices (one access point per 50 devices). When the devices are in range of this access point, they talk to the server and exchange simple information such as battery life, exhibits visited, notes written, etc.

When the administrator uploads new content (such as audio for a new exhibit), or changes the tour structure, a major "manual update" might be needed: that is, many of the devices will need to receive a large amount of data. The administrator can initiate this major update at any time. When a major update is in effect, the server takes turns uploading new content to the mobile devices that need it.

When a device is in the process of receiving a major update, it cannot be checked out to a visitor.

Status of Devices

With the mobile devices connected to the server, it is easy to check the status of each device. Devices can be quickly checked to determine which are fully charged, what audio program(s) exists on the devices, etc.

Because devices are always connected in sync, the server can always see, for example, the exact battery life, play list loaded, and last rental information.

Collect Usage Statistics

Usage statistics can also be gathered from the devices at synchronization time by the server. Information such as length of tour, stops visited, comments left, etc. can be gathered seamlessly by the server. This type of information is useful to administrators because it can show clearly, for example, which exhibits are the most visited, and which information is the most interesting. This is also known as logging. Everything the user does is logged by the system.

What is claimed is:

1. A method for using a mobile device, comprising:
   receiving a single signal transmitted from an access point in an environment, the transmitted single signal including a transmitted signal strength;
   determining a received signal strength for the single signal transmitted from the access point;
   comparing the received signal strength with a threshold signal strength for the access point, the threshold signal strength for the access point stored in a storage on the mobile device;
   determining a location for the mobile device in the environment as the access point if the signal strength exceeds the threshold signal strength; and
   presenting data to a user on the mobile device, the data contingent on the location of the mobile device in the environment.

2. A method according to claim 1, wherein:
   receiving a single signal includes receiving a plurality of single signals from a plurality of access points in the environment;
   determining a strength includes determining a strength for each signal from each access point;
   comparing the signal strength includes comparing the signal strength with a threshold signal strength for each access point, the threshold signal strength for the access point stored in a storage on the mobile device; and
   determining a location includes determining the location for the mobile device in the environment as a first access point with a highest signal strength for the first access point relative to a threshold signal strength for the first access point.

3. A method according to claim 2, wherein receiving a plurality of signals from a plurality of access points in the environment includes receiving the plurality of signals from the plurality of access points in the environment, each of the plurality of signals capable of carrying the data.

4. A method according to claim 3, further comprising accessing the data from a storage on a server from the mobile device using the signal with the highest signal strength.

5. A method according to claim 1, further comprising accessing the data from the storage on the mobile device.

6. A method according to claim 5, further comprising synchronizing the storage on the mobile device with a second storage on a server.

7. A method according to claim 6, wherein synchronizing the storage on the mobile device with a second storage on a server includes synchronizing the storage on the mobile device with a second storage on a server using the single signal.

8. A method according to claim 1, further comprising accessing the data from a storage on a server.

9. A method according to claim 8, wherein:
   the single signal contains the data; and
   accessing the data from a storage on a server includes decoding the data from the single signal.

10. A method according to claim 1, further comprising repeating the steps of receiving a single signal, determining a strength, comparing the signal strength with a threshold signal strength, determining a location, and presenting data to a user on the mobile device, the data contingent on the location of the mobile device in an environment.

11. A method according to claim 1, further comprising receiving an annotation from the user.

12. A method according to claim 11, wherein receiving an annotation includes associating the annotation with the location of the mobile device.

13. A method according to claim 12, further comprising making the annotation available to a second mobile device in the location.

14. A method for using a mobile device, comprising:
   receiving a signal from an access point in an environment;
   determining a strength for the signal from the access point;
   comparing the signal strength with a threshold signal strength for the access point, the threshold signal strength for the access point stored in a storage on the mobile device;
   determining a location for the mobile device in the environment as the access point if the signal strength exceeds the threshold signal strength;
   presenting data to a user on the mobile device, the data contingent on the location of the mobile device in the environment; and
   logging an activity of the mobile device.

15. A method according to claim 14, wherein logging an activity includes logging an input to the mobile device by the user.

16. A method according to claim 15, wherein logging an input to the mobile device by the user includes associating the input with the location of the mobile device.

17. A method according to claim 16, further comprising making the input available to a second mobile device in the location.

18. A method according to claim 14, logging an activity includes logging the data presented to the user.

19. A method according to claim 14, further comprising synchronizing the log of the activity with a server.

20. A method according to claim 19, further comprising accessing the log from the server by the user from a computer.

21. A method according to claim 19, wherein synchronizing the log of the activity with a server includes synchronizing the log of the activity with the server using the signal.

22. A method for using a mobile device, comprising:
   receiving a single signal from an access point in an environment;
   determining a signal strength for the single signal from the access point;

comparing the signal strength with a threshold signal strength for the access point, the threshold signal strength for the access point stored in a storage on the mobile device;

determining a location for the mobile device in the environment as the access point if the signal strength exceeds the threshold signal strength;

presenting data to a user on the mobile device, the data contingent on the location of the mobile device in the environment;

logging an activity of the mobile device, wherein logging the activity includes:
  logging an input to the mobile device by the user; and
  logging the data presented to the user; and synchronizing the log of the activity with a server.

23. A method for using a mobile device, comprising:

receiving a plurality of single signals transmitted from a plurality of access points in an environment, the transmitted single signals including a transmitted signal strength;

determining a received signal strength for each of the single signals transmitted from the access points;

comparing the received signal strengths with a threshold signal strength for each of the access points, the threshold signal strength for each of the access points stored in a storage on the mobile device;

determining the location for the mobile device in the environment as a first access point, wherein the signal strength above the threshold signal strength for the first access point is higher than the signal strengths above the threshold signal strengths of the remaining access points;

presenting data to a user on the mobile device, the data related to the first access point; and synchronizing the storage on the mobile device with a second storage on a server.

* * * * *